E. O. BLANKENSHIP.
SAW SET.
APPLICATION FILED JUNE 5, 1911.
1,033,663.
Patented July 23, 1912.
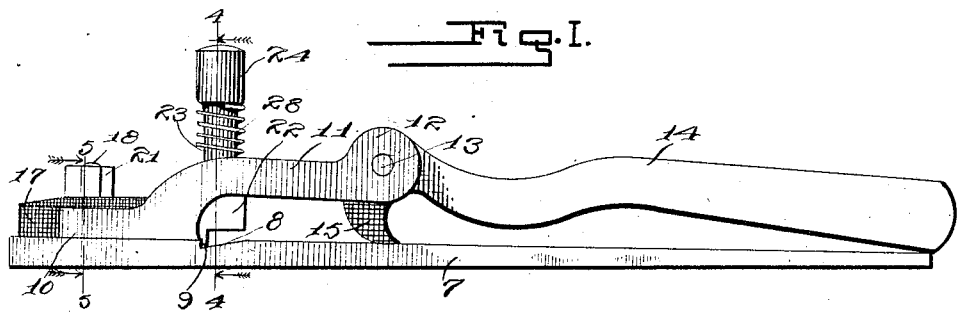
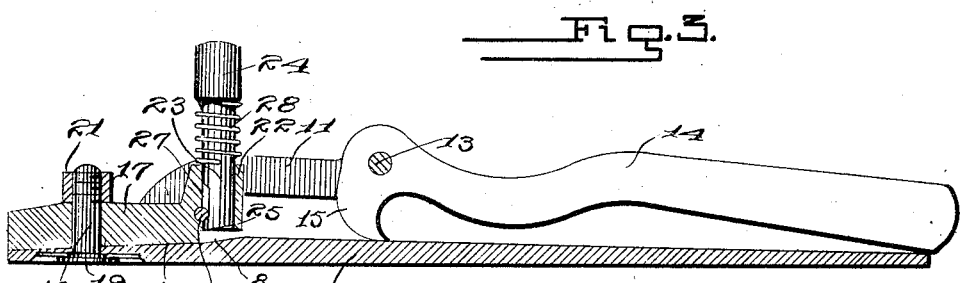
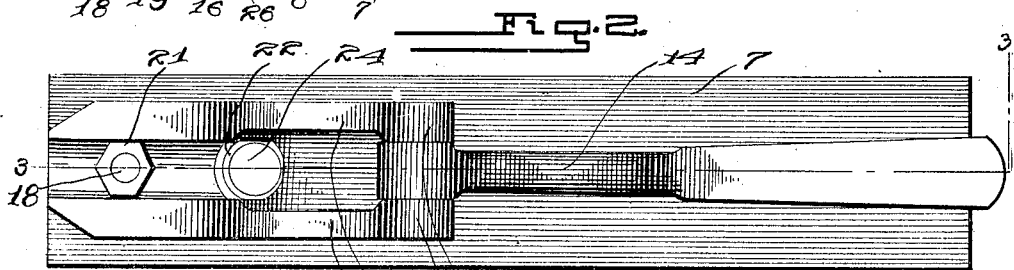
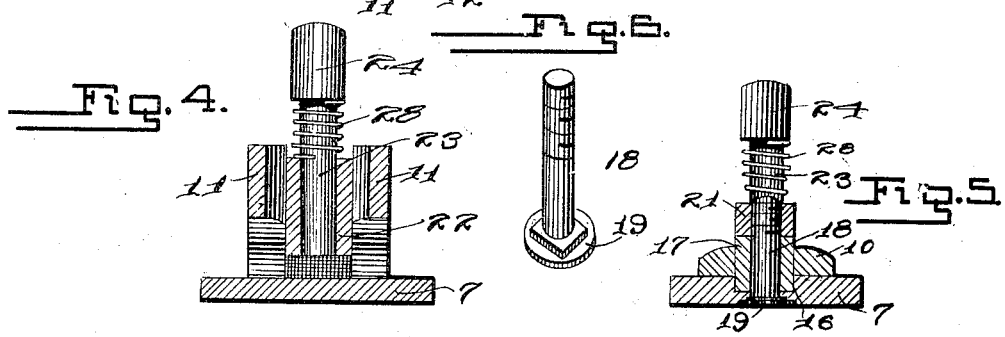
WITNESSES
Howard H Costello
E. L. Mueller
INVENTOR
Edward O. Blankenship
By E. E. Trooman
his Attorney.

UNITED STATES PATENT OFFICE.

EDWARD O. BLANKENSHIP, OF LAKESIDE, WASHINGTON.

SAW-SET.

1,033,663.  Specification of Letters Patent.  Patented July 23, 1912.

Application filed June 5, 1911. Serial No. 631,260.

*To all whom it may concern:*

Be it known that I, EDWARD O. BLANKENSHIP, a citizen of the United States, residing at Lakeside, in the county of Chelan and State of Washington, have invented certain new and useful Improvements in Saw-Sets, of which the following is a specification, reference being had therein to the accompanying drawing.

This invention relates to saw sets and has for its principal object to provide a device that can be easily and readily manipulated and which can be manufactured at a low cost.

The object broadly stated above is attained by the provision of a saw set comprising a base having a pair of longitudinally extending spaced apart arms, a gage and set mounted between said arms, and a handle pivoted to the arms for holding the saw in place while setting the teeth.

In carrying out the objects generally stated above it will be understood of course, that the essential features thereof are susceptible of changes in details and structural arrangements, a preferred and practical embodiment being shown in the accompanying drawings, wherein:—

Figure 1 is a view in side elevation constructed in accordance with this invention. Fig. 2 is a top plan view thereof. Fig. 3 is a side elevation partly in section. Fig. 4 is a transverse sectional view on the line 4—4 in Fig. 1. Fig. 5 is a transverse sectional view on the line 5—5 in Fig. 1. Fig. 6 is a perspective view of the bolt for securing the gage to the base of the saw set.

Referring to the drawings, it will be seen that the invention comprises a base 7 made of suitable material, which is thick adjacent the middle portion and tapers on its upper surface toward one end thereof. The base at its thickest portion is provided with a flat transverse groove 8 that is provided with a tooth abutting wall 9.

The end 10 of the base 7 is thickened to provide a pair of parallel spaced apart longitudinally extending arms 11. These arms are spaced from said base and extend toward the tapering end thereof. The free ends of the arms are each provided with a pivot ear 12 having a transverse opening for the reception of a pivot pin 13. A saw clamping handle 14 is pivotally mounted upon the pin 13 and is provided adjacent its pivot point with a cam 15 that is adapted to engage a saw and securely hold the same in position for setting.

Slidably mounted between the arms 11 and in a longitudinally extending inclined groove 16 that merges into the groove 8, is a gage 17. The gage is secured to the base 7 by means of a screw threaded bolt 18. Said bolt is provided with a head 19 that is countersunk in the elongated slot 20, of the base 7 and a nut 21 is screwed on to the other end of the bolt, thus securely clamping the gage to the base. The inner bottom end of the gage is reduced to provide an overhanging vertical sleeve 22 through which the striker 23 extends. The said striker is provided on its outer end with an enlarged head 24 and has its inner end 25 beveled so as to be parallel with the transverse groove 8. A transverse pin 26 passes through the sleeve 22 and is adapted to engage a longitudinally extending recess 27 in the shank of the striker to limit the vertical movement thereof and also prevent any rotary movement. Between the inner end of the head 24 and the outer end of the sleeve 22 a coil spring 28 is wound about the striker and is adapted to normally hold the same in a position shown in Fig. 3.

When it is desired to set a tooth, the handle 14 is raised and the saw is laid flat upon the upper surface of the base 7 so that the tooth to be set comes directly under the striker 23. The handle is then lowered and the cam 15 thereof engages the saw and causes it to be securely held in position. A hammer may then be employed to strike the head 24 thus causing the beveled end of the striker to come into contact with the tooth to be set and bend the same to the desired length. This length may be obtained by the longitudinal adjustment of the gage 17 by means of the bolt 18, and the slot 20 of the base 7.

What I claim as my invention is:—

1. A saw set comprising a base provided with a transverse groove, a pair of spaced apart arms projecting therefrom and extending longitudinally thereof, a gage slidable between said arms, a vertical sleeve at the inner end of said gage, a striker slidable in said sleeve and provided with a beveled inner end, said end being parallel with the face of said transverse groove, and means pivoted to said arms for clamping a saw in position on said base.

2. A saw set comprising a base, a pair of arms carried thereby, a handle pivoted to said arms, a cam on said handle, a gage slidable on said base, a vertical sleeve carried by one end of said gage, a striker slidable in said sleeve, a spring carried by said striker for normally retaining the same in a raised position, said striker being provided with a longitudinal recess and a transverse pin in said sleeve adapted to engage said recess for limiting the vertical movement and preventing rotary movement of said striker.

In testimony whereof I hereunto affix my signature in presence of two witnesses.

EDWARD O. BLANKENSHIP.

Witnesses:
 J. C. ENLOW,
 SARAH S. WOOD.